United States Patent [19]
Janssen et al.

[11] Patent Number: 5,620,288
[45] Date of Patent: Apr. 15, 1997

[54] FASTENING MEMBER ASSEMBLY TO BE DRIVEN INTO A HARD RECEIVING MATERIAL BY AN EXPLOSIVE POWDER CHARGE OPERATED SETTING TOOL

[75] Inventors: Rupert Janssen, Meiningen, Austria; Markus Froewis, Munich, Germany

[73] Assignee: Hilti Aktiengesellschaft, Fürstentum, Liechtenstein

[21] Appl. No.: 391,984

[22] Filed: Feb. 21, 1995

[30] Foreign Application Priority Data

Feb. 21, 1994 [DE] Germany ............ 44 05 410.6

[51] Int. Cl.⁶ ............................................. F16B 15/00
[52] U.S. Cl. .............................. 411/441; 411/440
[58] Field of Search .................... 411/440, 441, 411/544, 923, 480, 482

[56] References Cited

U.S. PATENT DOCUMENTS

| | | | |
|---|---|---|---|
| 128,602 | 7/1872 | Dittman | 411/544 |
| 3,428,169 | 2/1969 | Hilti | 411/440 |
| 3,516,323 | 6/1970 | O'Brian | 411/441 |
| 4,802,802 | 2/1989 | Thurner | 411/480 |
| 4,915,561 | 4/1990 | Buhri | 411/441 |
| 5,397,206 | 3/1995 | Sihon | 411/544 |

FOREIGN PATENT DOCUMENTS 116182  2/1969  Norway ............ 411/441

Primary Examiner—Flemming Saether
Attorney, Agent, or Firm—Anderson Kill & Olick P.C.

[57] ABSTRACT

A fastening member assembly includes an axially extending shank (1) with a leading end to be inserted into a receiving material and a trailing end with a load engagement member (2). The leading end has a tip (3). An axially extending section of the shank (1) is laterally enclosed by a sleeve (4) adjacent its leading end, and a stop (5) formed adjacent the trailing end of the sleeve. A bush (6) formed of impact-resistant plastics material encloses an axially extending section of the shank and extends from the stop (5) towards the leading end. When the fastening member is driven, the sleeve penetrates into a hard receiving material and the bush (6) deforms for absorbing excess driving energy, so that a member in the form of a retaining part being connected to the receiving member, is not destroyed.

10 Claims, 3 Drawing Sheets

FASTENING MEMBER ASSEMBLY TO BE DRIVEN INTO A HARD RECEIVING MATERIAL BY AN EXPLOSIVE POWDER CHARGE OPERATED SETTING TOOL

BACKGROUND OF THE INVENTION

The present invention is directed to a fastening member assembly, which is driven into a hard receiving material by an explosive powder charge operated setting tool. The fastening member assembly includes a shank with a tip at its leading end and a load engagement member at its trailing end with the load engagement member forming a shoulder projecting radially outwardly from the shank.

Fastening members of the above-described type are driven into hard receiving materials, such as concrete, masonry, rock, steel and the like. The fastening members are driven into the hard receiving material by explosive powder charge operated setting tools. A preferred use for such attachment members is for securing or connecting support members to the receiving material. Such support members can be in the form of holding or retaining parts serving to fix cable, tubes, insulation panels, extension members and the like. The fastening of such retaining parts occurs in such a way that after the driving process has been terminated, a shoulder of a load engagement means abuts or is supported at the retaining part and secures it against the receiving material.

The load engagement means for the fastening members can be shaped as a head which projects transversely from the diameter of the shank. Instead of a head, the load engagement means can be a threaded part also projecting beyond the diameter of the shank. In addition to forming a shoulder, the threaded part also serves for receiving nuts or the like.

Connecting elements, in the form of a retaining part of the type mentioned above, are mostly formed of plastics material, on the one hand for reasons of economy and on the other hand for reasons of insulation. The use of plastics material for the retaining part creates certain problems with the type of fastening member assembly described here when explosive powder charge operated setting tools are used. It must be assured that the retaining parts are held or stressed sufficiently against the receiving material. This assumes a defined setting depth of the fastening member so that on one hand the danger of insufficient stressing is avoided or on the other hand the danger of destruction of the retaining part is excluded.

When securing fastening members with the use of explosive powder charge operated setting tools, it is difficult to determine in advance the setting depth of the fastening members. Such uncertainty arises in part due to the inhomogeneity of the receiving material and in part because of the variation in the energy output of the propelling charge being used. The danger of destruction of the retaining parts is considerable in view of these problems.

SUMMARY OF THE INVENTION

Therefore, the primary object of the present invention is to provide a fastening member assembly which can be driven into hard receiving materials by explosive powder charge operated setting tools and which assures that connecting and retaining members to be fastened are on one hand sufficiently stressed or pressed against the receiving material and on the other hand are not damaged or destroyed.

In accordance with the present invention, the shank of the fastening member is surrounded by a sleeve along the section of its axial length and an energy absorbing means is provided along a section of the sleeve from a stop cooperating with the trailing or load engagement end of the sleeve.

When the fastening member is driven, the shoulder of the load engagement means bears against the stop on the sleeve. Accordingly, the sleeve is also driven against the receiving material. Depending on the excess energy remaining in the driving operation, the sleeve is driven into the receiving material to a greater or lesser extent. Driving the sleeve into the receiving material leads to the advantage that the shank is afforded additional guidance in spite of the spalling of the receiving materials which could possibly occur. Due to an energy absorbing means provided by the invention, any remaining excess energy is absorbed in such a manner that no shock-like stresses occur tending to destroy the receiving part.

Possibly, a disk can be used as a stop, with the disk positioned on the shank in a frictionally secured manner with its diameter projecting beyond the sleeve. Such a disk can also serve to guide the fastening member driven by the powder charge operated setting tool.

In another embodiment the stop can be located directly on the sleeve in the form of a flange having a diameter projecting laterally beyond the outside surface of the sleeve. Such a flange can also serve for guiding the fastening member in the powder charge operated setting tool. To achieve an adequate setting depth of the fastening member, preferably the axial length of the sleeve is approximately 0.3 to 0.8 times the axial length of the shank.

It is expedient with the energy absorbing element to provide a bush abutting the stop. It is of no significance whether the stop for the abutting bush is formed by a separate disk or by a flange formed directly on the sleeve.

Where energy absorption is concerned, optimum conditions are achieved if the length of the bush corresponds preferably to 0.3 to 0.8 times the length of the sleeve. As a result, the portion of the sleeve not enclosed by the bush can provide additional functions.

Such an additional function of the sleeve is that it can be in the form of a retaining part for penetrating through the retaining member. In such an arrangement, preferably the bush abuts at its leading end against a bulge or torus formed by the sleeve. The abutment of the bush at its trailing end is achieved at the stop, which can be a separate disk or a flange on the sleeve.

In addition the axial section of the sleeve not enclosed by the bush can penetrate the connecting member acting as a retaining part, whereby the bush expediently abuts at the leading end against the retaining part penetrated by the sleeve.

With regard to energy absorption, it is advantageous if the bush is formed of an impact resistant plastics material. The elastic properties of such a plastics material are especially advantageous in several respects.

In another embodiment of the invention, the energy absorbing means is preferably formed by an axially extending conically-shaped surface on the outside of the sleeve, whereby the conical surface cooperates with a disk bearing against a retaining part penetrated by the sleeve. In this embodiment, the sleeve can be driven into the receiving material. Furthermore, the conical surface on the outside of the sleeve is driven into the disk bearing against the retaining part which affords additional energy absorption by the deformation of the conical surface as well as by the disk. The disk as well as the stop may be shaped as a disk or a flange and serve for guiding the fastening member in the powder charge operated setting tool.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there are illustrated and described preferred embodiments of the invention.

DETAILED DESCRIPTION OF THE INVENTION

Figure 1:
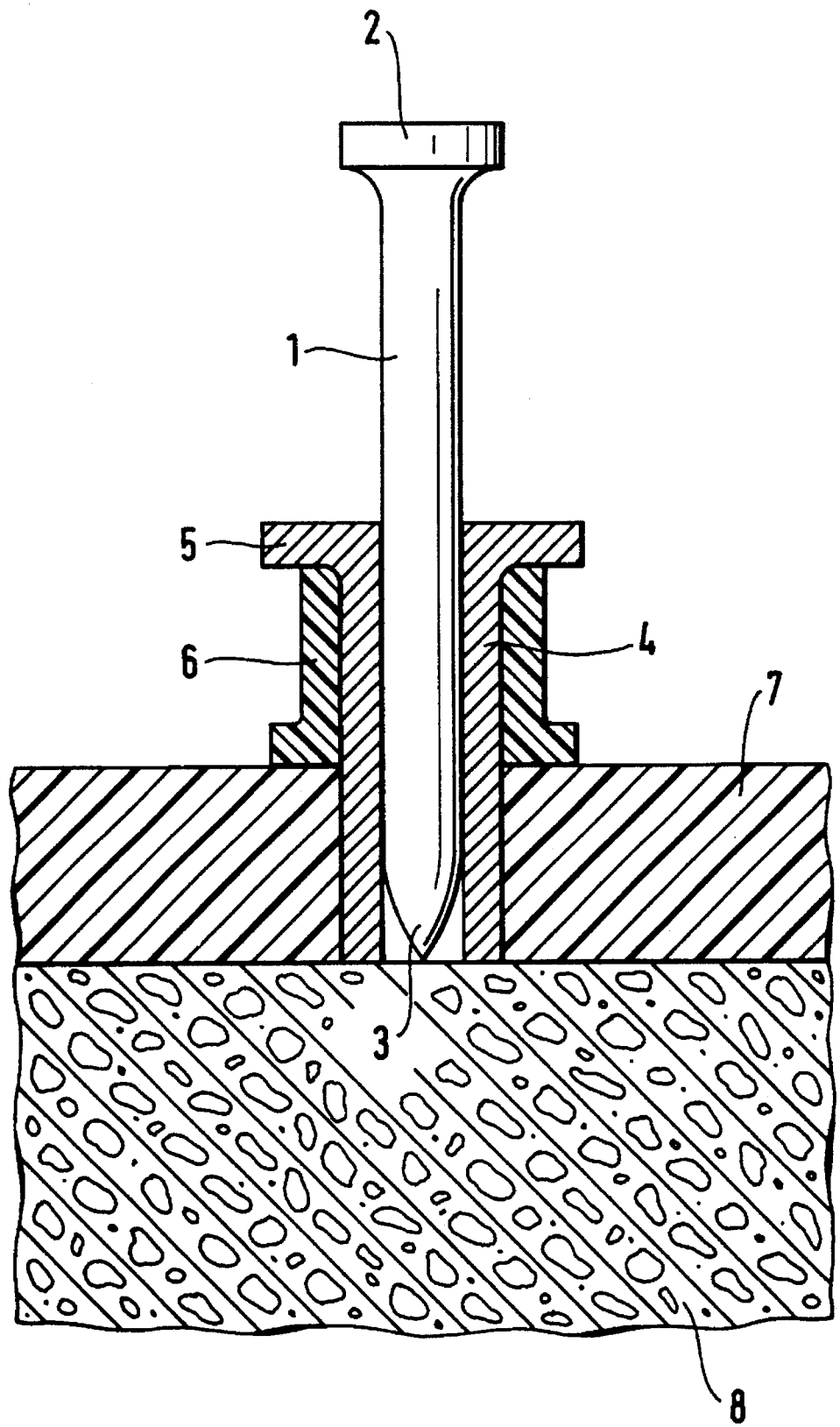
FIG. 1 is an elevational view of a fastening member assembly embodying the present invention, in position to be driven, and including a bush as an energy absorbing element.

FIG. 1 shows a fastening member assembly with a fastening member formed of an axially elongated shank 1 having a leading end, that is the end to be driven into a receiving material 8 and a trailing end. At its trailing end, the shank 1 has a load engagement means 2 in the form of a head projecting radially outwardly beyond the outside surface of the shank. At its leading end, the shank 1 has a pointed tip 3. In its leading end region, the shank is laterally enclosed by a sleeve 4 with the sleeve extending approximately half way from the leading end towards the trailing end. The sleeve 4 has a leading end contacting the surface of the receiving material 8 and a trailing end. At its trailing end, the sleeve has a stop 5 shaped as a flange projecting radially outwardly from the outside surface of the sleeve transversely of the axial direction. Extending from the surface of the stop 5 facing in the driving direction, that is, towards the leading end, there is a bush extending axially along the sleeve 4. The bush 6 acts as an energy absorbing means or element.

In the embodiment illustrated in FIG. 1, the sleeve 4 passes through a connecting member in the form of a retaining part 7. When the fastening element comprising the shank 1, the head 2 and the tip 3 is driven into the receiving material 8, the retaining part is secured against the surface of the receiving material. It is also possible that the sleeve 4 penetrates into the receiving material 8.

Figure 2:
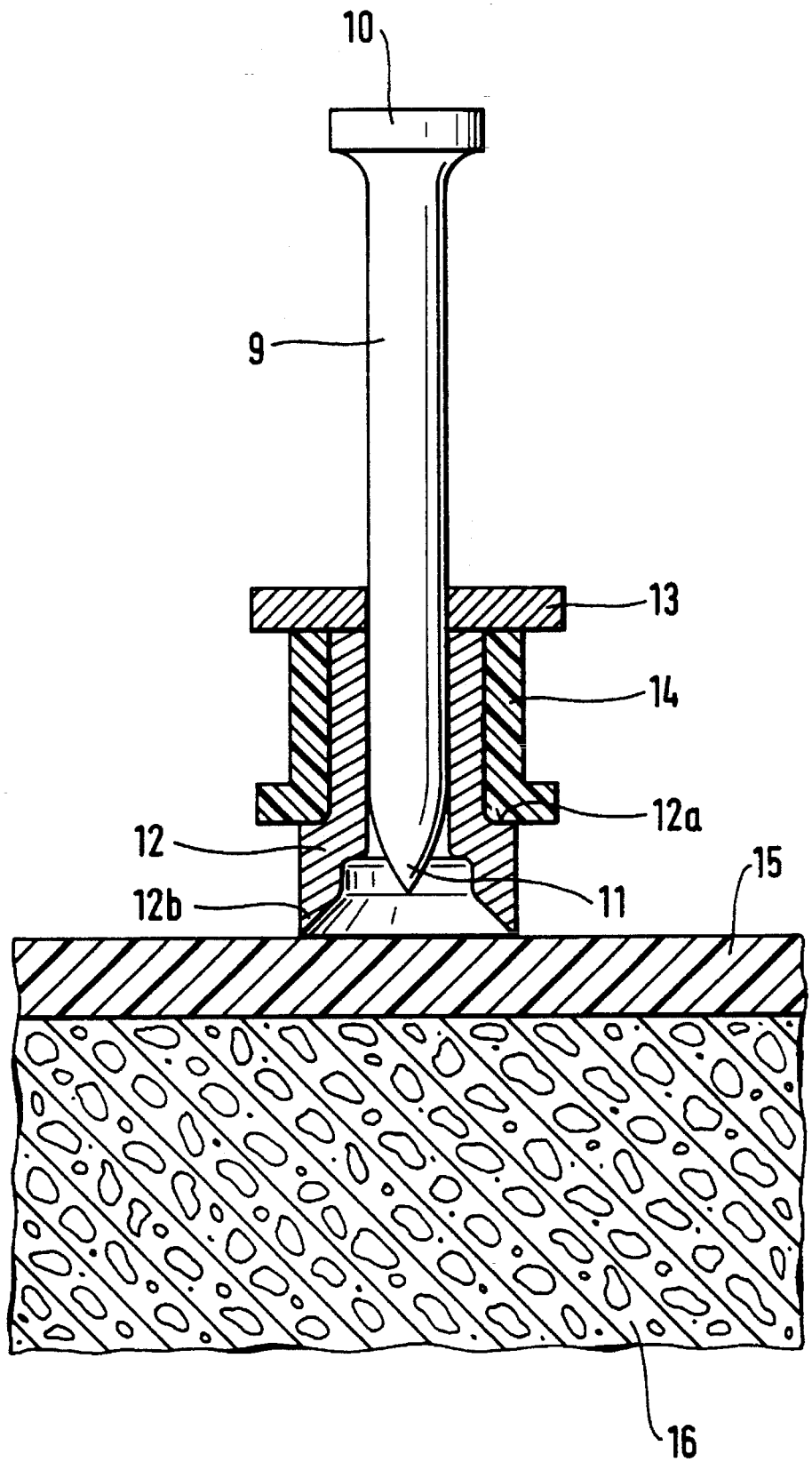
FIG. 2 is another embodiment of the fastening member assembly of the present invention in position to be driven, also with a bush as the energy absorbing element.

In the fastening member assembly displayed in FIG. 2, the fastening member has an axially extending shank 9 with a load engagement means 10 in the form of a head located at its trailing end. At its leading end, the shank 9 has a pointed tip 11 to be driven into the receiving material 16.

At its leading end, a portion of the axial length of the shank is enclosed by an axially extending sleeve 12. The trailing end of the sleeve forms a load engagement end at which a separate stop 13 is positioned in the form of a disk. The disk extends transversely of the axial direction outwardly beyond the outer surface of the sleeve.

The sleeve 12 is laterally enclosed by an axially extending bush 14 acting as an energy absorbing element. At it trailing end, the bush bears against the stop 13 and at its leading end it bears against a shoulder formed by a torus 12a on the sleeve.

As illustrated in FIG. 2, prior to the driving operation, the sleeve 12 bears against a connecting member in the form of a retaining part 15. During the driving operation, the tip 11 of the fastening member penetrates through the retaining part 15 and into the receiving material 16. Depending upon the available energy provided by the explosive powder charge operated setting tool, the sleeve also penetrates through the retaining part 15 and possibly into the receiving material 16. Accordingly, the leading end of the sleeve 12 is shaped as a cutting edge 12b. The tip 11 of the shank 8 is spaced rearwardly from the cutting edge 12 in position to be driven into the receiving material.

Figure 3:
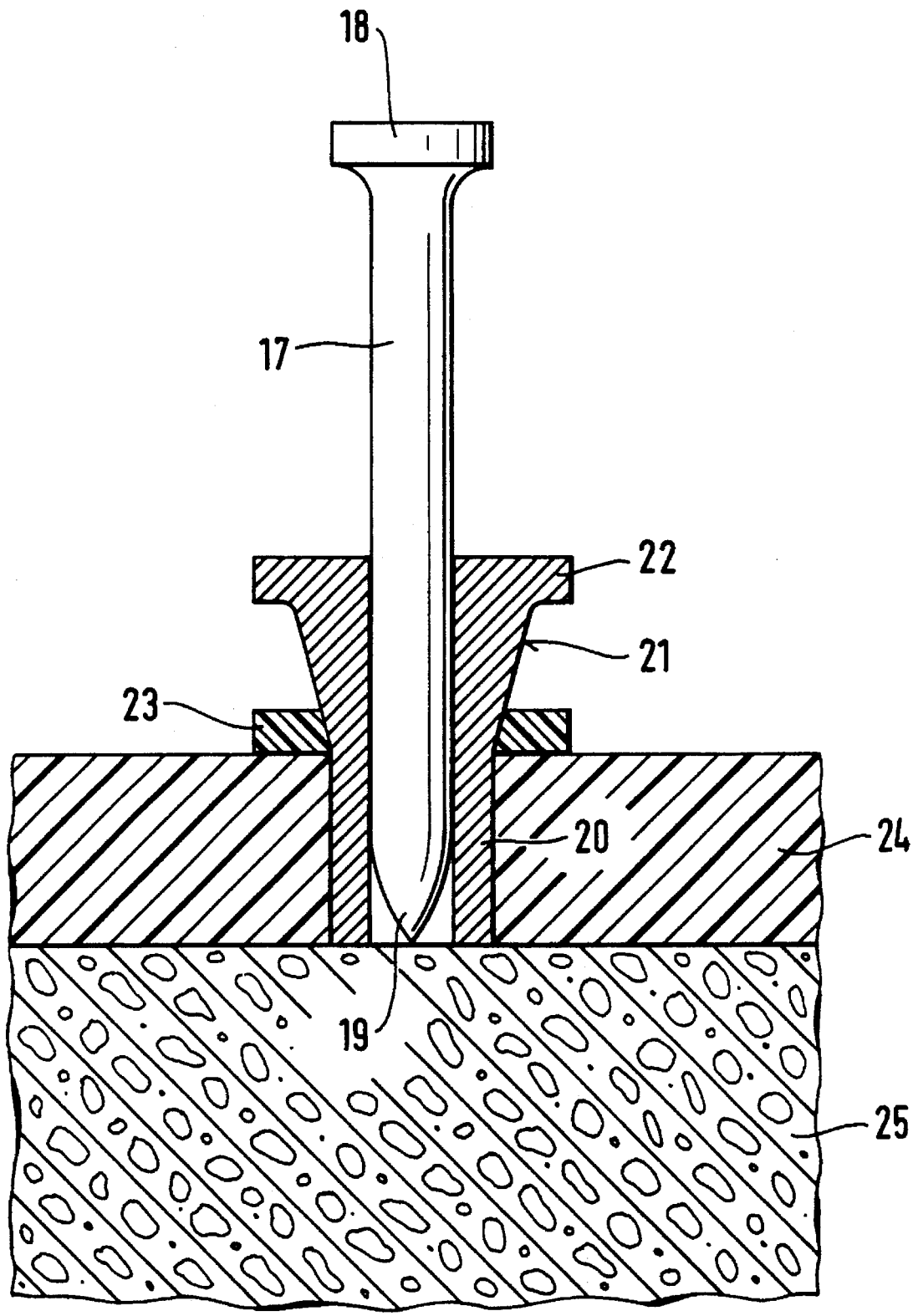
FIG. 3 is still another fastening member assembly embodying the present invention in condition ready to be driven with another energy absorbing element.

In FIG. 3 another fastening element assembly is displayed where the fastening member has an axially extending shank 17 with a load engagement means 18 in the shape of a head located at its trailing end. The head 18 projects radially outwardly from the outside surface of the shank 17. Further, the shank 17 has a tip 19 at its leading end. The leading end region of the shank 17 is laterally enclosed by an axially extending sleeve 20. The sleeve 20 has a conically-shaped outside surface 21 converging inwardly in the driving direction, that is, towards the leading end of the sleeve 20 or the tip 19 of the shank 17. As shown in FIG. 3, the smaller diameter end of the conical surface 21 is located within the opening of an annular disk 23 bearing against the outside surface of the retaining part 24. The trailing end of the sleeve 20 has a flange 22 extending radially outwardly from the larger diameter end of the conical surface 21.

The retaining part 24 is to be fixed to the receiving material 25. In the driving operation, the tip 19 and then the shank 17 of the fastening member penetrates into the receiving material 25 and, in addition, it is possible that the sleeve 20, extending through the retaining part 24 also penetrates into the receiving material. During the driving operation the conical surface 21 passes through the disk 23 affording energy absorption due to material deformation of both of these parts.

While a specific embodiment of the invention has been shown and described in detail to illustrate the inventive principles, it will be understood that the invention may be embodied otherwise without departing from said principles.

We claim:

1. Fastening member assembly, to be driven into a hard receiving material (8, 16, 25) by an explosive powder charge operated setting tool, comprising an axially extending shank (1, 9, 17) having a leading end to be driven into the receiving material and a trailing end, said shank has a tip (3, 11, 19) at the leading end and a load engagement means (2, 10, 18) at the trailing end forming a shoulder extending transversely outwardly from said shank, wherein the improvement comprises an axially extending sleeve (4, 12, 20) laterally enclosing said shank for a portion of the axial length thereof adjacent the leading end of said shank, said sleeve having a leading end and a trailing end, a stop (5, 13, 22) located at the trailing end of said sleeve projecting transversely outwardly from said sleeve, and energy absorbing means laterally enclosing such sleeve and located along an axially extending section of said sleeve from said stop towards the leading end of said sleeve.

2. Fastening member assembly, as set forth in claim 1, wherein said stop (13) is a disk located at the trailing end of and extending transversely outwardly from said sleeve (12) and surrounding said shank (9).

3. Fastening member assembly, as set forth in claim 1, wherein said stop (5, 22) is formed as a flange at the trailing end of said sleeve (4, 20) and projecting radially outwardly from the outside surface of said sleeve.

4. Fastening member assembly, as set forth in one of claims 1 to 3, wherein the axial length of said sleeve (4, 12, 20) corresponds to 0.3 to 0.8 times the length of the shank (1, 9, 17).

5. Fastening member assembly, as set forth in claim 2, wherein said energy absorbing means comprises a conically-shaped outside surface (21) of said sleeve (20) with said conically-shaped outside surface converging in the direction from the trailing end to the leading end of said sleeve and said conically-shaped surface (21) extends through an opening in a disk (23), and said disk bears against a retaining part (24) and said sleeve (20) extends through said retaining part (24).

6. Fastening member assembly, as set forth in claim 3, wherein said energy absorbing means comprises an axially extending bush (6, 14) laterally enclosing said sleeve (4, 12) and abutting at a trailing end thereof against said stop (5, 13).

7. Fastening member assembly, as set forth in claim 6, wherein the axial length of said bush (6, 14) is in the range of 0.3 to 0.8 times the axial length of said sleeve (4, 12).

8. Fastening member assembly, as set forth in claim 7, wherein said bush (14) has a leading end in bearing contact with a radially outwardly extending torus-shaped shoulder (12*a*) on said sleeve.

9. Fastening member assembly, as set forth in claim 7, wherein said bush (6) having a leading end spaced from and rearwardly of the leading end of said sleeve.

10. Fastening member assembly, as set forth in claim 7, wherein said bush (6, 14) is formed of an impact resistant plastics material.

\* \* \* \* \*